US007694084B2

(12) United States Patent
Raghavan et al.

(10) Patent No.: US 7,694,084 B2
(45) Date of Patent: Apr. 6, 2010

(54) ULTRA LOW POWER ASIP ARCHITECTURE

(75) Inventors: Praveen Raghavan, Tamil Nady (IN); Francky Catthoor, Temse (BE)

(73) Assignee: IMEC, Leuven (BE)

( * ) Notice: Subject to any disclaimer, the term of this patent is extended or adjusted under 35 U.S.C. 154(b) by 427 days.

(21) Appl. No.: 11/372,983

(22) Filed: Mar. 10, 2006

(65) Prior Publication Data

US 2006/0212685 A1      Sep. 21, 2006

(30) Foreign Application Priority Data

Mar. 11, 2005   (EP)  .................................. 05447054

(51) Int. Cl.
*G06F 13/00* (2006.01)
(52) U.S. Cl. ........................ 711/154; 712/225; 713/300
(58) Field of Classification Search ................. 711/154; 712/225; 713/300
See application file for complete search history.

(56) References Cited

U.S. PATENT DOCUMENTS

| 4,731,739 | A | * | 3/1988 | Woffinden et al. .......... 711/206 |
| 4,949,247 | A | | 8/1990 | Stephenson et al. |
| 5,754,875 | A | | 5/1998 | Getzlaff et al. |
| 6,260,137 | B1 | | 7/2001 | Fleck et al. |
| 2002/0040429 | A1 | * | 4/2002 | Dowling ..................... 712/228 |

OTHER PUBLICATIONS

Jayapala, M. F. Barat T. Aa, G. Deconinck, F. Catthoor, H. Corporaal, "Clustered L0 Buffer Organization for Low Energy Embedded Processors", in Proc. of 1$^{st}$ Workshop on ASPs (WASP), Nov. 2002, IEEE.*
Ayala, et al., "Energy Aware Register file Implementation through Instruction Predecode" ASAP, IEEE, 2003.
Biswas, et al, "Introduction of Local Memory Elements in Instruction Set Extensions" DAC, Jun. 7-11, 2004, San Diego, CA pp. 729-734.
Gomez, et al., "Optimizing the Memory Bandwidth with Loop Morphing" Application Specific Systems, Architectures and Processors, 2004, Proceedings. 15$^{th}$ IEEE International Conference, pp. 213-223.
Gonzalez, "Xtensa: A Configurable and Extensible Processor" IEEE, Mar.-Apr. 2000, pp. 60-70.
Kim, et al. "The Microarchitecture of a Low Power Register File" Advanced Computer Architecture Lab, University of Michigan, Aug. 25-27, 2003, Korea, pp. 384-389.

(Continued)

*Primary Examiner*—Pierre-Michael Bataille
*Assistant Examiner*—John P Fishburn
(74) *Attorney, Agent, or Firm*—Knobbe Martens Olson & Bear LLP

(57) ABSTRACT

A microcomputer architecture comprises a microprocessor unit and a first memory unit, the microprocessor unit comprising a functional unit and at least one data register, the functional unit and the at least one data register being linked to a data bus internal to the microprocessor unit. The data register is a wide register comprising a plurality of second memory units which are capable to each contain one word. The wide register is adapted so that the second memory units are simultaneously accessible by the first memory unit, and so that at least part of the second memory units are separately accessible by the functional unit.

17 Claims, 12 Drawing Sheets

OTHER PUBLICATIONS

Lee, et al. "Energy-Efficient Instruction Set Synthesis for Application-Specific Processors" EECS, Seoul National University Aug. 25-27, 2003; pp. 330-333.

Vander, et al,, "Instruction Buffering Exploration for Low Energy VLIWs with Instruction Clusters", Design Automation Conference, 2004, pp. 825-830.

Yu, et al, "Characterizing Embedded Applications for Instruction-Set Extensible Processors" DAC, Jun. 7-11, 2004, San Diego, CA.

Faraboschi, et al. Lx: A Technology Platform for Customizable VLIW Embedded Processing, Proceedings of the $27^{th}$ International Symposium on Computer Architecture, Jun. 10-14, 2000, Vancouver, Canada.

Yu, et al., Scalable Custom Instructions Identification for Instruction-Set Extensible Processors, International Conference on Compilers, Architecture, and Synthesis for Embedded Systems, Sep. 22-25, 2004, Washington DC.

* cited by examiner

```
Original Code
for i = 1 to 100
{
    for j = 1 to 10
    {
        for k = 1 to 50
        {
            ......
        }
    }
}
```

```
Derived Organization - 1
for i' = 1 to 100
{
    for j' = 1 to 10
    {
        for k' = 1 to 50
        {
            ......
        }
    }
}
```

```
Derived Organization - 2
for i' = 1 to 100
{
    for j' = 1 to 500
    {
        ......
    }
}
```

```
Derived Organization - 3
for i' = 1 to 100
{
    for k' = 1 to 50
    {
        ......
    }
}
```

```
Derived Organization - 4
for i' = 1 to 5000
{
    ......
}
```

ULTRA LOW POWER ASIP ARCHITECTURE

TECHNICAL FIELD OF THE INVENTION

The present invention relates to a microcomputer architecture with reduced power consumption and methods of operating the same.

BACKGROUND OF THE INVENTION

Several emerging applications require sustained battery-less operation based on scavenging energy. A very important domain for this consists of in-vivo biomedical applications that execute complex biomedical analysis of sensor data, in order to produce higher-level information that can then be transmitted to a centralized emergency/info gathering service. On the longer term, the use of this information can even be envisaged to directly decide on triggering on-line activation of recovery means like submitting specific medicine quantities in-vivo. The potential of this technology is enormous but several basic research challenges exist today that prevent people from realizing this ambitious vision. One issue is the complexity and robustness of reliable in-vivo biomedical analysis systems. In order to reduce the false positive rate in detectors of clinical events an extension from classical signal processing algorithms to non-stationary signals, and complex advanced adaptive filtering techniques (based upon multi linear algebra such as e.g. Singular Value Decomposition, Total Least Squares, Principle Component Analysis and Independent Component Analysis) are needed.

It is crucial that an intelligent sensor system as e.g. indicated above stays below the scavenging energy limit of about 50 µW continuous supply. In order to provide sufficient algorithmic flexibility and easy updates after the implant has been put inside the body, the market would strongly prefer a quite programmable or configurable platform. Using state-of-the-art architecture styles and instances would lead to an energy budget problem that cannot be overcome. The relationship between energy and task is relevant for these domains, and can be expressed in MIP/mJ or MIPS/mW, where MIP can be defined as Million RISC Instructions and MIPS can be defined as Million RISC Instructions Per Second. The rough estimate for such an intelligent system running a seizure detection like algorithm under the given power constraint is about 1000 to 10000 MIPS/mW.

The power breakdown for a representative signal processing application based on such VLIW-DSP templates shows that now the data register-file (also called foreground memory) and also the level-1 data and instruction memories form the main bottlenecks. Similar studies have been done for mobile multimedia terminal applications. The requirements in that case are 10000 MIPS and the limit on the power consumption would be about 300 mW. So the MIPS/mW figure should also exceed 1000 MIPS/mW. Also other low power applications will benefit from the processor architecture according to the present invention.

VLIW (Very Long Instruction Word) architectures execute multiple instructions per cycle, packed into a single large "instruction word" or "packet", and use simple, regular instruction sets. However, even the most power-efficient ASIPs (Application-domain Specific Instruction-set Processors) today that are based on VLIW DSP (Digital Signal Processing) templates arrive only at about 50 MIPS/mW. A huge gain of about a factor 20 to 200 is thus required.

A traditional design strategy of ASIPs consists of the two steps: (1) the design of the basic processor with its basic instruction set, and (2) the design of the custom instructions with their corresponding custom hardware. Tensilica's Xtensa as described by R. E. Gonzalez in "Xtensa: A configurable and extensible processor", IEEE Micro, 20(2), 2000; and HP's and STMicroelectronics' Lx as described by P. Faraboschi et al. in "Lx: a technology platform for customizable VLIW embedded processing", Proc. of ISCA, 2000, are some of the presently commercially available ASIPs.

At the compiler end still not much is available either. Tools like Target Compiler's Chess framework or Coware's LisaTek allow the design of the custom instruction set and the hardware required by these instructions. But they do not improve the energy consumption a great deal. Academic research in the design of ASIPs has focused on the problem of identification and implementation of an efficient set of instruction set extensions. Examples thereof are described by P. Biswas, V. Choudhary, K. Atasu, L. Pozzi, P. Ienne and N. Dutt in "Introduction of Local Memory Elements in Instruction Set Extensions", Proceedings of DAC, June 2004, pp-729-734; by P. Yu and T. Mitra in "Characterizing Embedded Applications for Instruction Set Extensible Processors", Proceedings of DAC, June 2004, pp-723-728; and by P. Yu and T. Mitra in "Scalable Instructions Identification for Instruction Set Extensible Processors", Proc of CASES, September 2004. Although most of the work has focused on improving the performance, not much work has been done specifically in the area of reducing energy consumption. J. Lee, K. Choi and N. D. Dutt do present, in "Energy-Efficient Instruction Set Synthesis for Application-Specific Processors", Proc of ISLPED, August 2003, a way to extend the instruction set based on the energy-efficiency of the new instructions.

Most energy efficient techniques that are currently used, reduce the power consumption of ASIPs, but do not attack the core bottleneck of the power problem viz. the instruction memory hierarchy and the register file.

The power consumption of the register file is a growing problem as stated by J. L. Ayala, M. L. Vallejo, A. Veidenbaum and C. A. Lopez in "Energy Aware Register File Implementation through Instruction Precode", Proc of ASAP, 2003. This is because of the trend towards highly parallel architectures which impose a large port requirement on the register file. FIG. 1 plots the energy consumption per access of a 32-bit register file with respect to the number of read and write ports. It can be clearly seen that, as the number of ports increases, the energy/access increases drastically. The authors in cited document address the problem of reducing the energy consumption in processors by utilizing a hardware based approach by turning unused registers into low power states.

N S. Kim and T. Mudge, in "The Microarchitecture of a Low Power Register File", Proc of ISLPED, 2003, pp-384-389, also highlight the problem of the register file and introduce a technique that reduces the register file power consumption, but with a loss in performance.

SUMMARY OF CERTAIN INVENTIVE ASPECTS

It is an object of certain inventive aspects to provide an improved microcomputer architecture as well as methods of operating the same. An advantage of these aspects is to reduce power consumption.

The above objective is accomplished by a method and device according to certain inventive aspects.

In a first aspect, the present invention provides a microcomputer architecture comprising a microprocessor unit and a first memory unit. The microprocessor unit comprises a functional unit and at least one data register, the functional unit and the at least one data register being linked to a data bus which is internal to the microprocessor unit. According to the present invention the data register is a wide register, called a very wide register hereinafter, comprising a plurality of second memory units which are capable to each contain one word. The wide register is adapted so that the second memory units are all simultaneously accessible by the first memory unit. The wide register is furthermore adapted so that at least part of the second memory units are separately accessible by the functional unit. The above access of the second memory units by the first memory unit may comprise a bidirectional access, i.e. data from the first memory unit may be written into the second memory units and/or data from the second memory units may be retrieved or read by the first memory unit. However, such read and write actions from and to the second memory units cannot take place simultaneously. The second memory units can, however be accessed for reading or writing by the first memory unit, and at the same time be accessed by the functional unit, i.e. a simultaneous reading of all words present in the wide data register for storing into the first memory unit may take place at the same time as a writing operation performed by the functional unit on one of the words in the wide data register, or a simultaneous writing of all words in the wide data register from the first memory unit may take place at the same time as a reading of a single word performed by the functional unit.

The wide register has a width determined by the number of second memory units in the data register, i.e. the wide register has a width which equals a plurality of words. More particularly, the wide register has a width equal to the number of second memory units in the data register, expressed in words. In other words, the wide register is a single line register of which all second memory units are simultaneously accessible. This is advantageous, as no pre-decoder is needed for accessing the second memory units. The fact that all second memory units are simultaneously accessible does not mean that they need to be accessed all at the same time; only a selection of these may be accessed at any moment in time.

From the above it can be deduced that, according to the present invention, the register width is larger than the width of the functional unit, the functional units having a width of a word.

The wide register preferably is a single-ported register.

If the microprocessor unit and the first memory unit are coupled to a system bus having a bus width, the plurality of second memory units in the wide register together having a register width, then the bus width may equal the register width. At the same time, the bus width may equal the line width of the first memory unit.

If the microprocessor unit and the first memory unit are coupled to a system bus having a bus width, the microprocessor unit comprising a plurality of data registers, each having a register width determined by the number of second memory units in the data register, then the bus width may equal the sum of the register widths. At the same time, the bus width may equal the line width of the first memory unit.

The first memory unit has a line width, and the bus width may equal the line width. This means that a complete line of data from the first memory unit may be transferred from and to the data register(s).

In a microcomputer architecture according to an embodiment of the present invention, the microprocessor unit may furthermore comprise a selector for selecting words in a data register and routing it towards the functional units. The selector may be a multiplexer adapted for selecting words to be read from the data register. The selector may comprise multiple multiplexers connected in parallel to a same data register, thereby making multiple reads from the same data register possible.

The functional unit may be an application specific unit or a general purpose unit coupled to the multiplexer for processing selected data from the data register.

The selector may comprise a demultiplexer adapted for selecting, in the data register, words to be written.

A microcomputer architecture according to an embodiment of the present invention may furthermore comprise at least a memory management unit, preferably programmable, for transferring data from and to the first memory unit to and from the at least one data register. Each of the functional unit, the memory management unit and the selector may have their own instruction buffer associated therewith. These instruction buffers are for storing instructions of a loop of code corresponding to an application to be executed. Each of the instruction buffers may be adapted for containing different code.

A microcomputer architecture according to a further embodiment of the present invention furthermore comprises a further data register comprising a plurality of second memory units which are capable to each contain one word, the further data register being adapted so that the second memory units are simultaneously accessible by the first memory unit, and at least part of the second memory units are separately accessible by the functional unit. The microcomputer architecture may furthermore comprise a demultiplexer connected between the functional unit and the further data register.

In a microcomputer architecture according to embodiments of the present invention, a word may comprise a plurality of subwords, and the architecture may furthermore comprise a data shifter for shifting subwords or parts of subwords so as to form a new word.

In a second aspect, the present invention provides a method for executing an application on an architecture according to embodiments of the present invention. Such architecture at least comprises a microprocessor unit and a first memory unit. The microprocessor unit comprises a functional unit and at least one data register, the functional unit and the at least one data register being linked to a data bus which is internal to the microprocessor unit. The data register is a wide register comprising a plurality of second memory units which are capable to each contain one word. The wide register is adapted so that all the second memory units are simultaneously accessible by the first memory unit and so that at least part of the second memory units are separately accessible by the functional unit. The method according to embodiments of the second aspect of the present invention comprises simultaneously reading a plurality of words from the first memory unit and simultaneously writing the plurality of words into all second memory units of the data register, separately reading one or more of the plurality of words from the data register, and performing an operation, by the functional unit, on the one or more words read, thus obtaining a result.

The method may furthermore comprise writing the result into a second memory unit of the data register.

The method may furthermore comprise simultaneously reading a plurality of words from the data register and simultaneously writing the plurality of words into the first memory unit. The data register into which the plurality of words are simultaneously written and the data register from which the plurality of words are simultaneously read may be physically one and the same data register.

In a third aspect, the present invention provides a method for converting, during a compile time phase, application code into execution code suitable for execution on an architecture according to embodiments of the present invention. Such architecture at least comprises a microprocessor unit and a first memory unit. The microprocessor unit comprises a functional unit and at least one data register, the functional unit and the at least one data register being linked to a data bus which is internal to the microprocessor unit. The data register is a wide register comprising a plurality of second memory units which are capable to each contain one word. The wide register is adapted so that the second memory units are all simultaneously accessible by the first memory unit and so that at least part of the second memory units are separately accessible by the functional unit. The method according to an embodiment of the third aspect of the present invention comprises: (a) obtaining application code, the application code including memory access operations, and (b) converting at least part of the application code such that the memory access operations are translated into, on the one hand, read operations comprising simultaneously reading of a plurality of words from the first memory unit and simultaneously writing the plurality of words into all second memory units of the data register, and, on the other hand, write operations comprising simultaneously reading a plurality of words from the data register and simultaneously writing the plurality of words into the first memory unit. This conversion of application code this way is done to reduce power consumption due to memory accesses.

The converting may furthermore determine instructions for the functional unit, said instructions defining a first code, and instructions for the at least one selector, said instructions defining a second code. The first code may have a first number of iterations and the second code may have a second number of iterations, the first number of iterations being different from the second number of iterations.

A method according to a further embodiment of the present invention may furthermore comprise merging said first code and said second code so as to obtain a single code. If, according to a further embodiment of the present invention, the functional unit and the selector each have an instruction buffer associated therewith, the method may furthermore comprise demarcating the single code with control flags for indicating which instruction buffer instructions of the single code should be placed into.

Also described is a compiler for converting application code into execution code, comprising means for receiving application code, the application code including memory access operations, means for converting at least part of the application code such that the memory access operations are translated into: (a) read operations comprising simultaneously reading of a plurality of words from the first memory unit and simultaneously writing the plurality of words into all second memory units of the data register, and (b) write operations comprising simultaneously reading a plurality of words from the data register and simultaneously writing the plurality of words into the first memory unit.

In a fourth aspect, the present invention provides a method for execution of an application, the method comprising reading code as converted in accordance with embodiments of the present invention, retrieving control flags from the converted code, and placing code in corresponding instruction buffers based on the retrieved control flags.

It is an advantage of various embodiments of the present invention that devices and methods with reduced power consumption are obtained, due to a reduced number of memory accesses.

Particular aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of these aspects will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
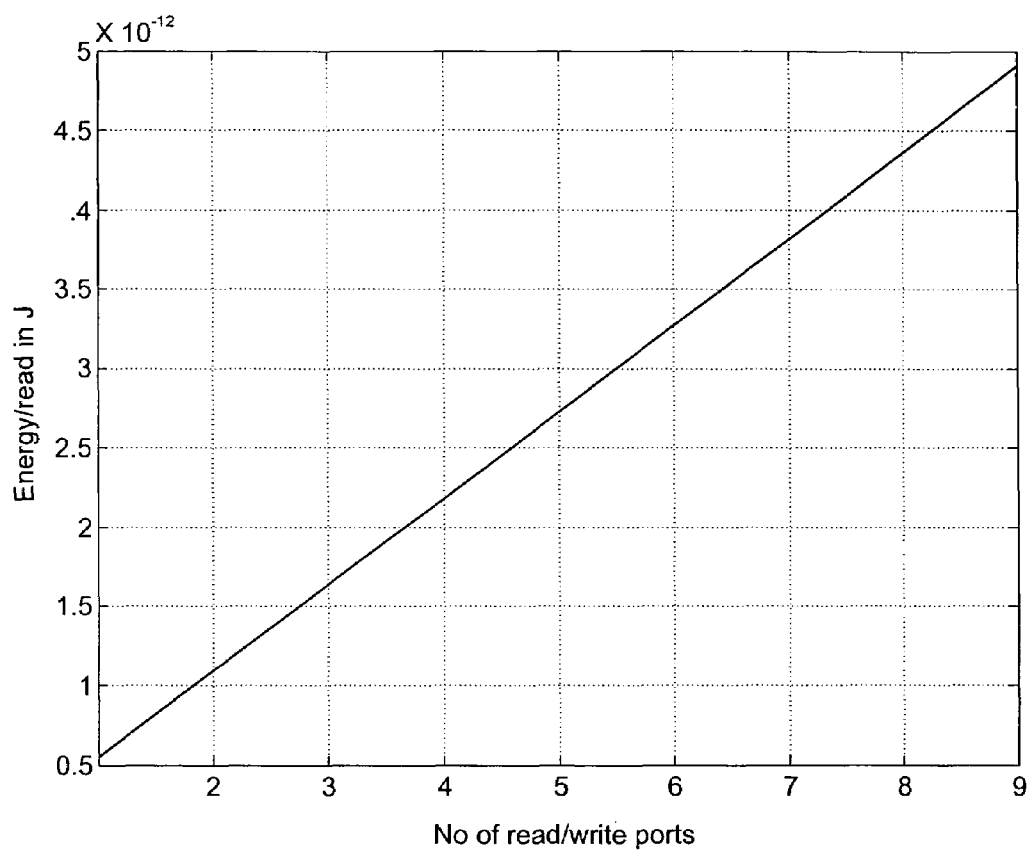
FIG. 1 illustrates register file energy consumption in function of the number of read/write ports.

In the different figures, the same reference signs refer to the same or analogous elements.

DESCRIPTION OF CERTAIN ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the elements listed thereafter; it does not exclude other elements or steps. It specifies the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 2:
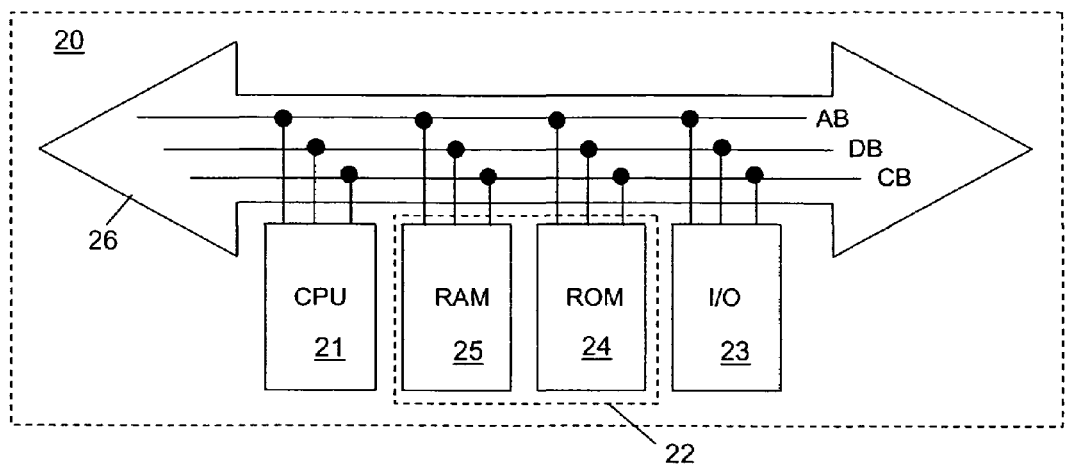
FIG. 2 is a block diagram of a microcomputer.

A microcomputer 20 has three basic blocks, as illustrated in FIG. 2: a central processing unit (CPU) 21, a memory unit 22 and an input/output unit 23.

The CPU 21 executes all the instructions and performs arithmetic and logic operations of data. The CPU 21 of the microcomputer 20 is also called the microprocessor. The CPU 21 is typically a single Very Large-Scale Integration (VLSI) chip that contains registers 31, a control unit 32 and functional units 33, such as e.g. arithmetic and logic circuits, of the microcomputer 20. The power of the microcomputer 20 is determined by the capabilities of the microprocessor 21. The number of data and address pins on the microprocessor chip make up the microcomputer's word size and maximum memory size.

The memory unit 22 stores both data and instructions. The memory unit 22 typically contains ROM chips 24 and RAM chips 25. The ROM 24 can only be read and is non-volatile, i.e. it retains its content when the power is turned off. The ROM 24 is typically used to store instructions and data that do not change. The RAM 25 can be read from and written to. The RAM 25 is volatile, i.e. it does not retain its contents when the power is turned off. A RAM 25 is used to store programs and data that are temporary and might change during the course of executing a program.

The input/output unit 23 transfers data between the microcomputer 20 and external devices. The transfer involves data, status and control signals.

FIG. 2 illustrates the most simplified version of a typical microcomputer, 20 indicating the basic blocks 21, 22, 23 and the various busses AB, DB, CB that connect the basic blocks 21, 22, 23. The microcomputer's system bus 26 comprises three busses AB, DB, CB, which carry all the address, data and control information involved in program execution. These busses AB, DB, CB connect the microprocessor 21 to each of the ROM 24, the RAM 25 and I/O unit 23 so that information transfer between the microprocessor 21 and any of the other elements can take place.

In the address bus AB, information transfer takes place only in one direction, from the microprocessor 21 to the memory unit 22 or I/O unit 23. Therefore it is called a "unidirectional bus". The size of the address bus AB determines the total number of memory addresses available in which programs can be executed by the microprocessor 21.

In the data bus DB, data can flow in both directions, i.e. to or from the microprocessor 21. Therefore, this is called a "bidirectional bus".

The control bus CB transfers of a number of signals that are used to synchronise the operation of individual microcomputer elements. The microprocessor 21 sends some of these control signals to the other elements to indicate the type of operation being performed. Each microcomputer 20 has a unique set of control signals.

In the microcomputer 20, most information transfers are carried out with respect to the memory unit 22. When the memory unit 22 is receiving data from another microcomputer element, it is called a WRITE operation, and data is written into a selected memory location. When the memory unit 22 is sending data to another microcomputer element, it is called a READ operation, and data is being read from a selected memory location.

Figure 3:
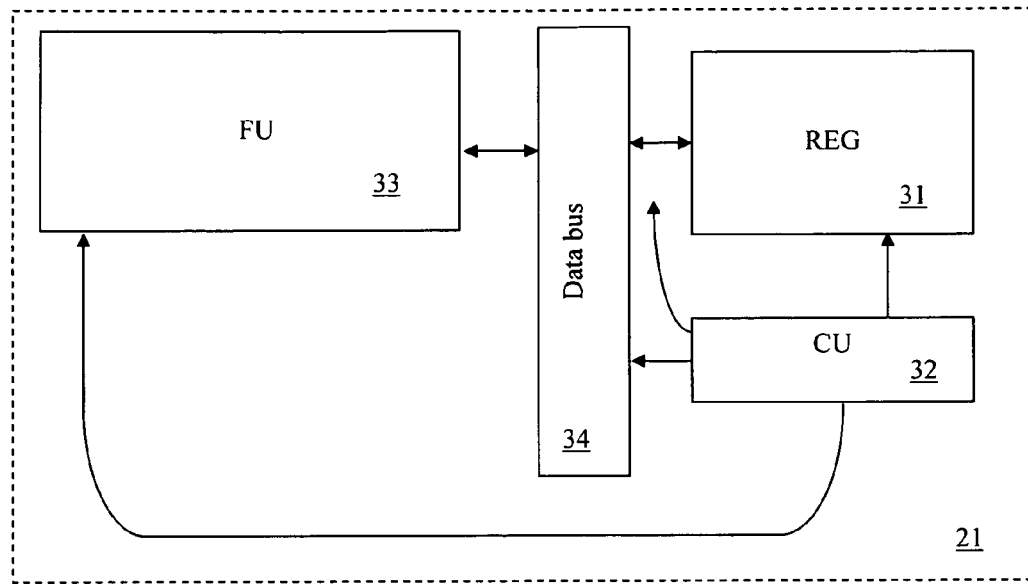
FIG. 3 is a block diagram of a microprocessor.

The logic inside the CPU or microprocessor chip can be divided into three main parts: a register section (memory section) 31 comprising at least one and typically a plurality of registers, the functional unit 33, e.g. arithmetic and logic unit, and the control unit 32 which translates instructions and performs the desired tasks. A typical microprocessor is illustrated in FIG. 3.

The number, size and types of registers in the register section 31 vary from one microprocessor 21 to another. However, the various registers in all microprocessors carry out similar operations. The register structures of microprocessors play a major role in designing the microprocessor architectures. Also, the register structures for a specific microprocessor determine how convenient and easy it is to program this microprocessor. Different types of registers exist.

One type of register is the instruction register. The instruction register stores instructions. The contents of an instruction register are always decoded by the microprocessor 21 as an instruction. After fetching an instruction code from memory, the microprocessor 21 stores it in the instruction register. The instruction is decoded internally by the microprocessor 21 which then performs the required operation.

The program counter contains the address of an instruction, normally of the next instruction to be executed. To execute an instruction, the microprocessor 21 typically places the contents of the program counter on the address bus AB and reads (fetches) the contents of this address, i.e. reads the instruction from memory unit 22. The program counter's contents are automatically incremented by the microprocessor's internal logic.

The memory address register contains the address of data. The microprocessor 21 uses the address, which is stored in the memory address register, as a direct pointer to the memory unit 22. The content of the address is the actual data that is being transferred.

A further type of register is the data register or general-purpose register, for storing temporary data or for carrying out data transfers between various registers. The use of general-purpose registers speeds up the execution of a program because the microprocessor 21 does not have to read data from external memory via the data bus DB if data is stored in one of its general-purpose registers.

The functional unit 33 is a digital circuit which performs data manipulations on one or more n-bit digital words, such as e.g. arithmetic and logic operations, inside the microprocessor 21. Typical operations performed by the functional unit 33 are addition, subtraction, ANDing, ORing and comparison of two n-bit digital words. The word size of the microprocessor 21 determines the size of the data. For example, a 16-bit microprocessor operates on 16-bit data. The size of the functional unit 33 conforms to the word length of the microcomputer 20. This means that a 32-bit microprocessor 21 will have a 32-bit functional unit.

The main purpose of the control unit 32 is to read and decode instructions from the program memory. To execute an instruction, the control unit 32 steps through the appropriate blocs of the functional unit 33 based on the instruction codes contained in the instruction register. The instruction codes define the operations to be performed by the control unit 32 in order to execute an instruction. The control unit 32 interprets the contents of the instruction register and then responds to the instruction by generating a sequence of enable signals. These signals activate the appropriate functional unit blocs to perform the required operation. Furthermore, the control unit 32 generates the control signals, which are output to the other microcomputer elements via the control bus CB. The control unit 32 also takes appropriate actions in response to the control signals on the control bus CB provided by the other microcomputer elements.

FIG. 3 shows a functional block diagram of a simple microprocessor 21. It is to be noted that the data bus 34 shown is internal to the microprocessor chip and should not be confused with the system bus 26 as illustrated in FIG. 2. The system bus 26 is external to the microprocessor 21 and is used to connect all the necessary chips to from a microcomputer 20.

In a first aspect of the present invention, a microcomputer architecture 40 is provided which can look like the microcomputer architecture described above, thus comprising at least a microprocessor unit 41 or CPU and a first memory unit 42, the microprocessor unit 41 comprising a control unit 43, at least one functional unit 44 and at least a data register 45 being part of a foreground memory. The first memory unit 42 may be a data memory hierarchy comprising for example a scratchpad memory 151 e.g. comprising SRAM, and other memory 155, e.g. comprising SDRAM. The microcomputer architecture according to the first aspect of the present invention is illustrated in FIG. 4.

Each of these parts of the system is discussed in more detail hereinafter. Although each part of the architecture can be optimized largely independently of each other, when used together it has a much higher potential of reaching much lower total energy consumption.

Figure 4:
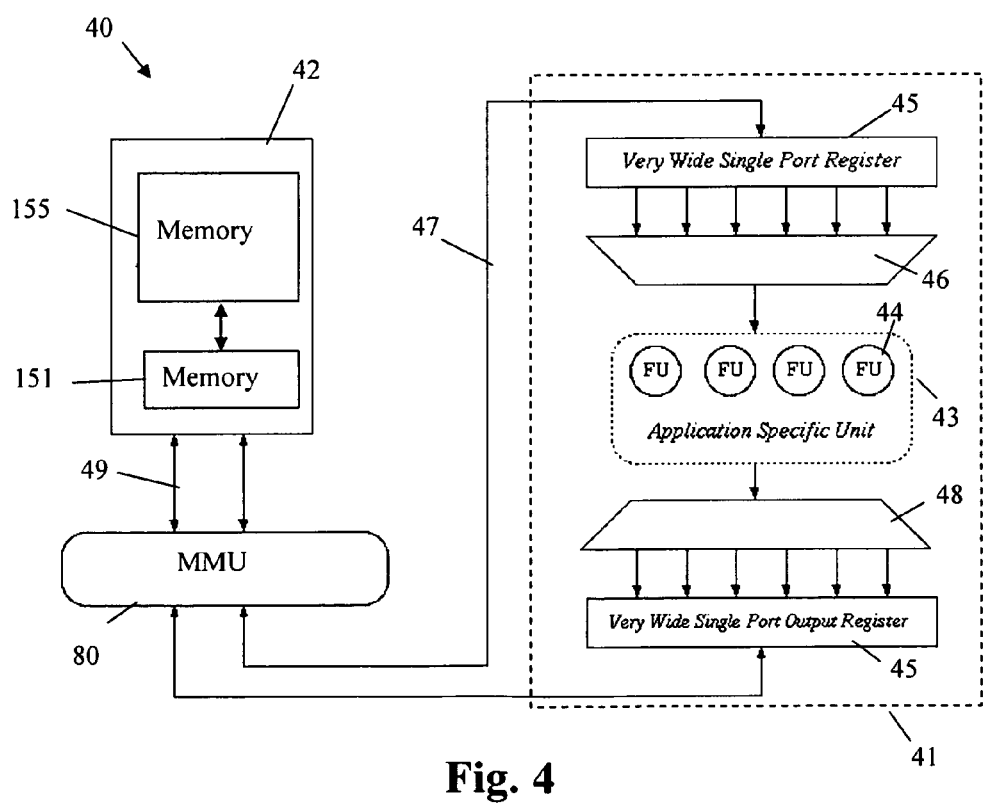
FIG. 4 illustrates an architecture according to an embodiment of the present invention.

As illustrated in FIG. 4, according to an embodiment of the present invention and contrary to prior art microcomputer architectures, the foreground memory comprises one or more data registers 45 which have a width which is larger than the word length used for the functional units 44 of that architecture, e.g. the registers 45 may be as wide as the line size of the first memory unit 42, also called background memory. The registers 45 can be all single ported. The at least one data register 45 thus is a very wide register (VWR) comprising a plurality of second memory units which are capable to each contain one word. This means that the information potentially present in a data register 45 according to the present invention comprises a plurality of words, and is thus more than what a functional unit 44 of the microprocessor unit 41 can handle. Therefore, selection means such as a multiplexer 46 are provided in order for the functional units 44 to select certain information from the data register 45. The selection means 46 may subsequently select different words from the data temporarily stored in the data register 45, under control of a loop buffer (see further). By doing so, less read actions from the first memory unit 42 are required, and as reading from memory turns out to be very power hungry, less reading actions result in lower power consumption.

The at least one very wide register 45 is adapted so that the second memory units which it contains are simultaneously accessible from the first memory unit 42 and vice versa. This means that a very wide bus 47, 49 is provided, with a width which at least equals the width of the very wide register 45, i.e. with a width which exceeds the word length of the microcomputer architecture 40. This means that e.g. complete data lines can be read from the first memory unit 42 and written into these very wide registers 45. A memory management unit 80 is provided for transferring data between the at least one very wide register 45 and the first memory unit 42. Data transferred from the first memory unit 42 to the very wide register 45 and vice versa can be transferred at once from the one to the other. This set-up leads to a system where a single line of data may be transferred from the first memory unit 42 to the very wide register 45. The very wide registers have no pre-decode circuit present but have only a post-decode circuit which may consist of a selector such as a multiplexer 46, which selects the words that are to be read from the very wide register 45.

Figure 5:
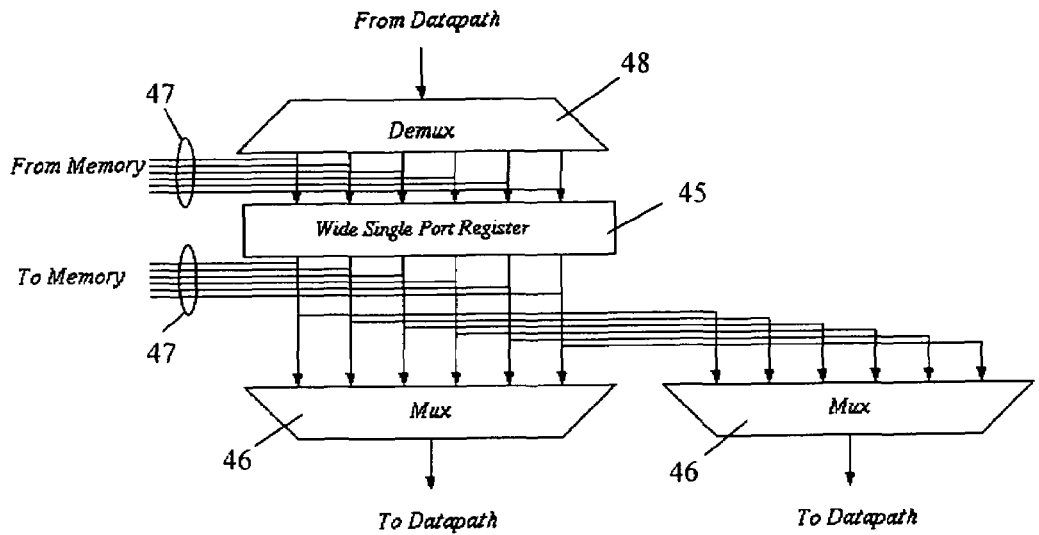
FIG. 5 illustrates a very wide register organization according to an embodiment of the present invention.
Figure 6:
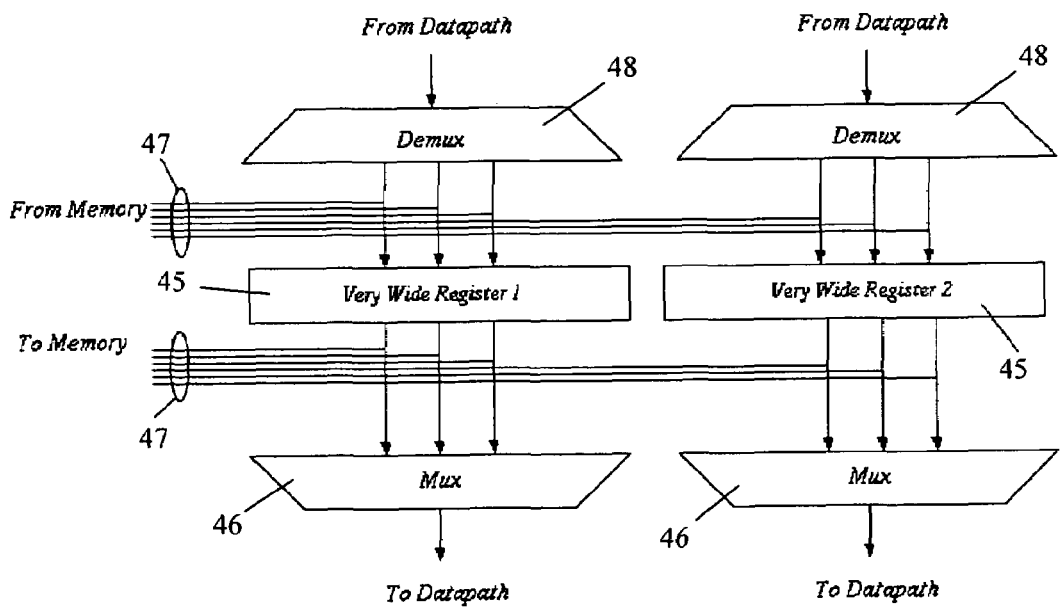
FIG. 6 illustrates another very wide register organization according to an alternative embodiment of the present invention.

One such very wide register 45 is shown in FIG. 5. Multiple selectors such as multiplexers 46 can be connected in parallel to a same very wide register 45, thereby making multiple reads from a same register file possible, as illustrated in FIG. 5. Another possible organization is that a complete line can be loaded from the first memory unit 42 in parallel to two very wide registers 45 or stored from two very wide registers 45 to the first memory unit 42, as illustrated in FIG. 6. Each of these very wide registers 46 have their own selectors such as multiplexers 46 and demultiplexers 48 as shown in FIG. 6. As illustrated in FIG. 5, the bus 47 may be as wide as the width of the very wide registers 45, which may e.g. be as wide as the line width of the first memory unit 42, or the bus 47 may be wider than the width of the very wide registers 45, as illustrated in FIG. 6.

The very wide register 45 is furthermore adapted so that at least part of the second memory units, part of the very wide register, are separately accessible from a functional unit 44. In order to obtain this, a selector may be provided, such as a multiplexer 46 for example, for selecting one or more of the stored words from the very wide register 45 and applying it to a functional unit 44 where data manipulations are carried out.

The very wide register 45 may be able to comprise a complete line of data from the first memory unit 42, or even more than one line of data. Alternatively, the very wide register 45 may be able to comprise only part of a line of data from the first memory unit 45. Anyway it is able to contain more than one word.

It is an advantage of the present invention that a single-ported very wide register is used, therefore alleviating problems due to increased ports existing prior art solutions. In very wide multi-port registers, a plurality of words of data from the first memory unit cannot be written at once into the very wide registers; the data for the different words has to be sequentially transferred over the bus and via the ports into the registers. The solution according to the present invention drastically reduces energy consumption.

The controls of the selectors such as the multiplexers 46 and demultiplexers 48 are controlled by a loop buffer that steers the register access. By using separate selectors, e.g. multiplexers 46, to read multiple words from a same very wide register 45, the capacitance at the bitlines is reduced. This is a more power-efficient solution compared to the standard multi-port solution. It should also be noted that the read and write access of the registers 45 to the first memory unit 42 and access to the datapath comprising the functional units 44 do not happen in parallel.

Figure 7:
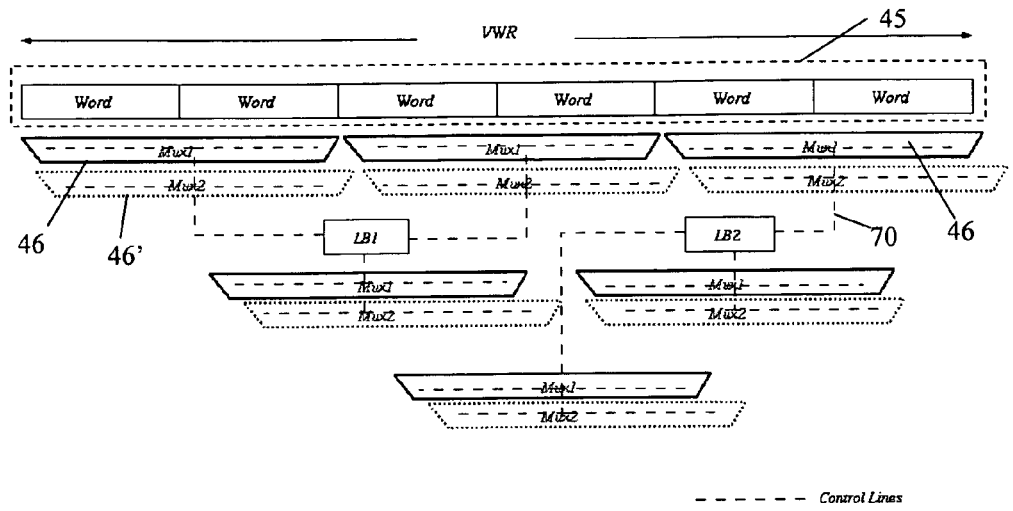
FIG. 7 shows a layout optimization for very wide registers according to an embodiment of the present invention.

To further optimize power it is also possible to optimize the physical layout for this microcomputer organization as shown in FIG. 7. A loop buffer or instruction buffer is a set of instructions stored in a memory unit, which may for example be a set of instruction registers. Loop buffering is an efficient mechanism to reduce energy consumption in the instruction memory of embedded processors. FIG. 7 shows two loop buffers LB1, LB2 controlling the multiplexers 46 for the very wide register 45. More loop buffers can be used in an efficient placement with respect to the very wide register 45 and multiplexers 46 such that the energy consumption is reduced further. FIG. 7 also shows the usage of two sets of multiplexers 46, 46' in parallel (like in FIG. 6), with one set of multiplexers 46 in solid black and another set of multiplexers 46' in dotted-gray. The dashed lines 70 in FIG. 7 indicate control signals sent from the loop buffers to the multiplexers 46. It can be seen from FIG. 7 that these lines 70 are distributed (almost) symmetrically and therefore are most optimized for energy. A similar layout optimization can be applied to the demultiplexer circuit.

Figure 8:
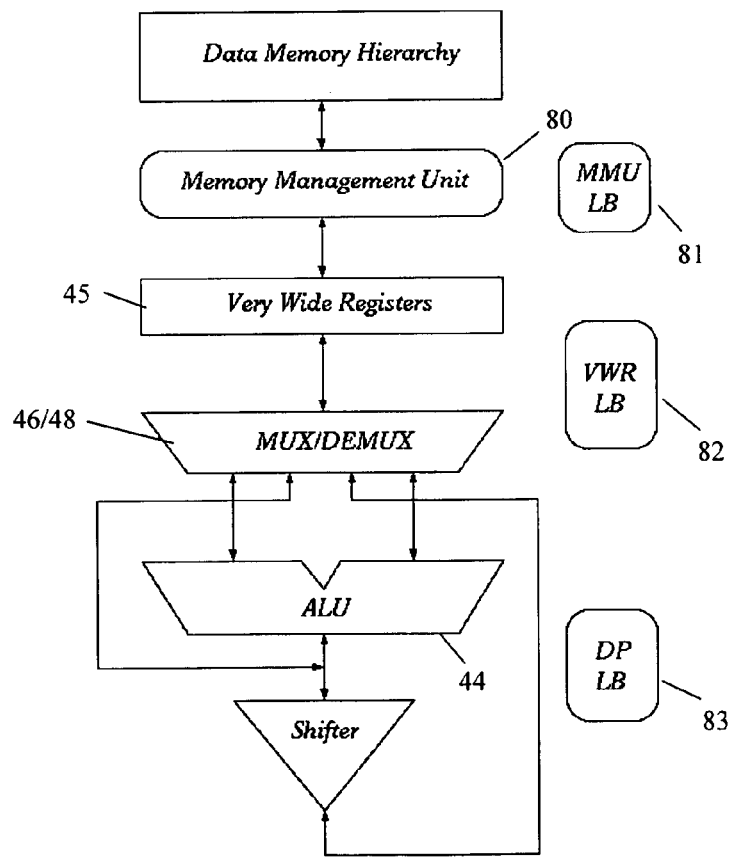
FIG. 8 illustrates an architecture with loop buffers according to a further embodiment of the present invention.

The instruction memory hierarchy for the system consists of at least two layers: L1 instruction cache and distributed loop buffers. Each of the different components of the microprocessor core 41 (viz. a memory management unit (MMU) 80, the very wide register 45 and the datapath DP) according to a further aspect of the present invention may have its own loop buffer with the decoded instructions corresponding to that component. This is illustrated in FIG. 8. These loop buffers MMU LB 81, VWR LB 82 and DP LB 83, are loaded on encountering a special instruction LBON, which is inserted by the compiler, similar to the work presented by T. Vander Aa, M. Jayapala, F. Barat, G. Deconinck, R. Lauwereins, F. Catthoor and H. Corporaal in "Instruction Buffering Exploration for Low Energy VLIWs with Instruction Clusters", Asian Pacific Design and Automation Conference, 27-30 Jan. 2004.

Figure 9:
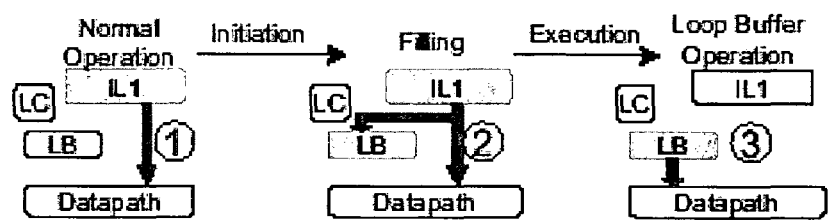
FIG. 9 illustrates operation of a processor in three phases, controlled by a local controller: first normal operation, then filling of the loop buffer, and then loop buffer operation.

FIG. 9 illustrates the essentials of a low power loop buffer. Instructions are fed to the microprocessor unit 41 on the datapath either from the level 1 instruction cache IL1 or through the loop buffer LB.

Initially the loop buffer LB is turned off and the program executes via the level 1 instruction cache IL1 (left hand side of FIG. 9). When a special instruction is encountered marking the beginning of the loop that has to be mapped to the loop buffer LB, the loop buffer LB is turned on. The form of this special instruction is LBON<startaddress>,<endaddress>, where startadress is the address of the first instruction of the loop and endaddress that of the last one. These values are stored in a local controller LC and will be used during the execution of the loop.

If the instruction LBON is encountered and no startaddress is stored in the local controller LC, or the startaddress in the local controller LC is different from the one in the LBON instruction, the first iteration will be used to fill the loop buffer LB. The instruction stream will go from the level 1 instruction cache IL1 both to the loop buffer LB and to the processing unit on the datapath (middle of FIG. 9). After the first iteration, the level 1 instruction cache IL1 can be put into low power mode and only the loop buffer LB is used (right hand side of FIG. 9) until the end of the loop execution.

When the loop buffer LB is used, the local controller LC will translate the program counter to an index in the loop buffer LB by using the stored startaddress. This mechanism reduces the power by avoiding the expensive tag memory found in normal caches. When the local controller LC detects the program counter is bigger than endaddress, the loop buffer LB is turned off.

Figure 12:
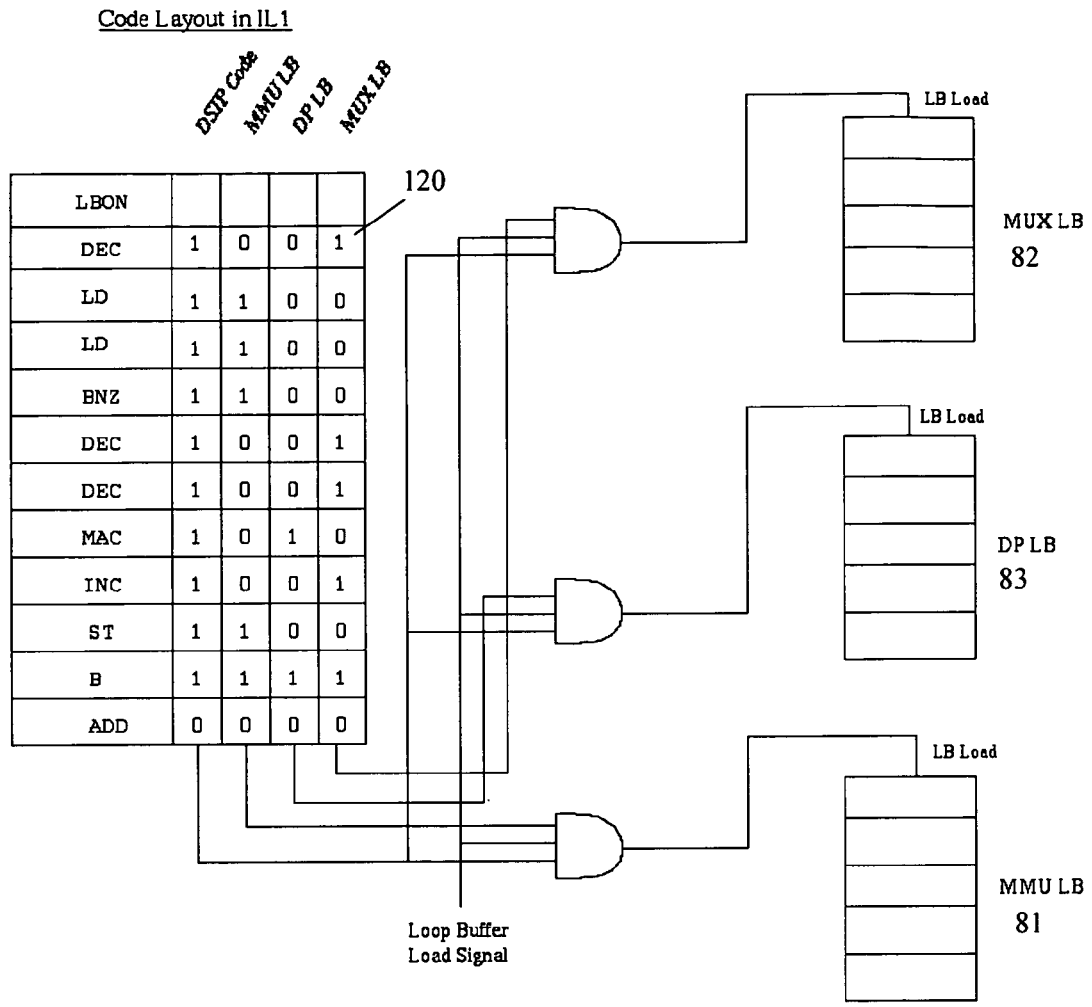
FIG. 12 shows instruction Level 1 cache and loop buffer organization.

The novel extension to this known loop buffer approach, according to a further embodiment of the present invention, is that each loop buffer LB has its own control bit 120 or flag, as shown in FIG. 12. This control bit 120 indicates whether or not an instruction of the loop code needs to be written into that particular loop buffer.

For the microprocessor 41, there exist one or more of the following three modes of operation:
1. Non-asip mode (corresponding to the left hand side of FIG. 9)
2. Filling loop buffer (corresponding to the middle of FIG. 9), and
3. Asip mode (corresponding to the right hand side of FIG. 9).

During the non-asip mode, the instructions are fetched from the instruction cache IL1 and executed on the standard VLIW datapath. During the filling loop buffer mode, the decoded instructions are filled into all the loop buffers that have to be updated based on their control bit or flag. During the asip mode, the decoded loop code is executed in the ASIP-datapath in conjunction with the MMU and the foreground memory (registers).

Figure 10:
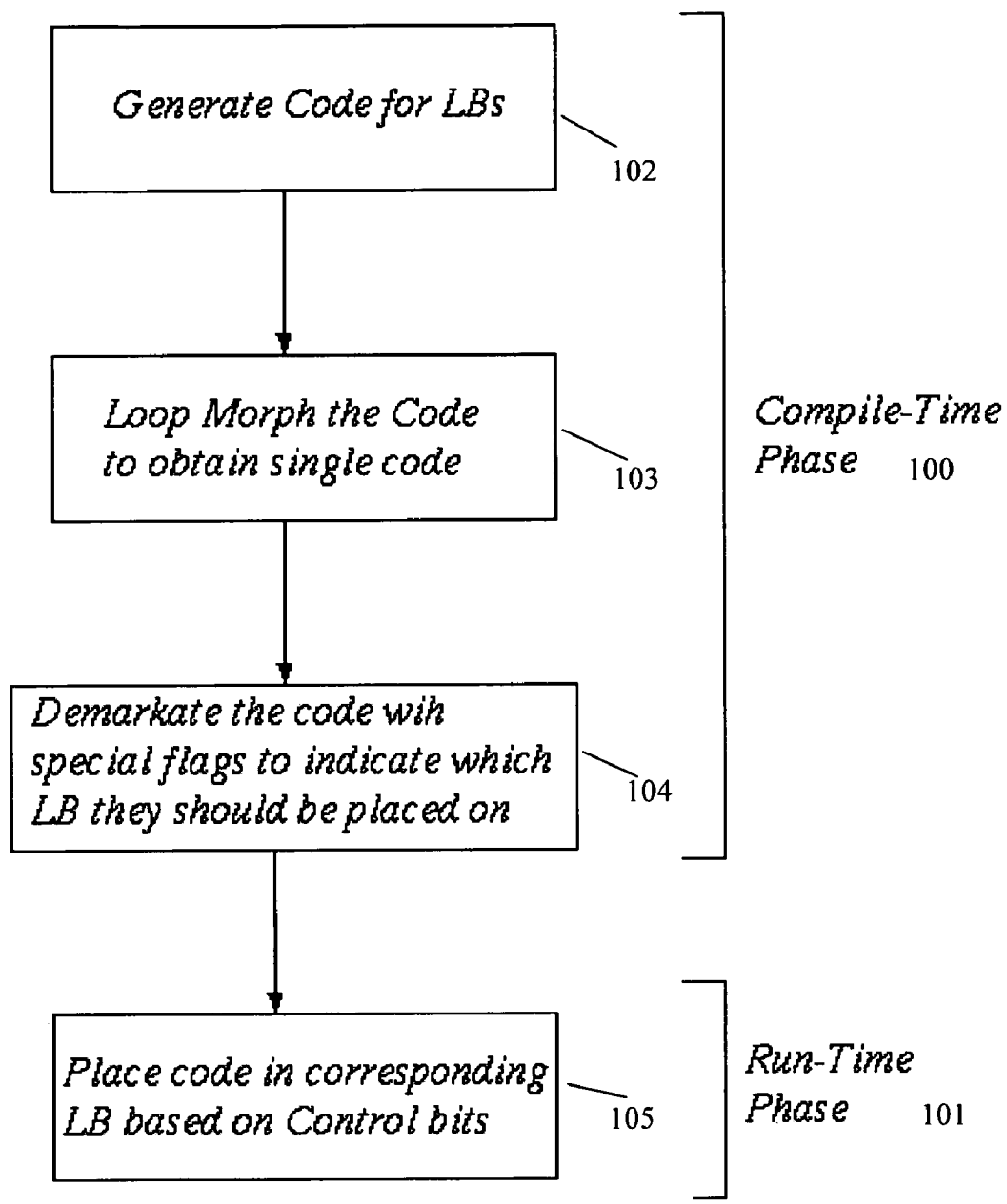
FIG. 10 illustrates compile-time and run-time organization of the loop buffer code according to an embodiment of the present invention.

The instruction memory for this system is organized in a unique way. Since separate code is required for each of the loop buffers LB, the instruction memory hierarchy should be optimized as well according to an aspect of the present invention. The steps that are required for running code on this architecture are illustrated in FIG. 10. The process comprises two distinct parts: a compile time part 100 and an execution time part 101 based on architecture support.

Figure 11:
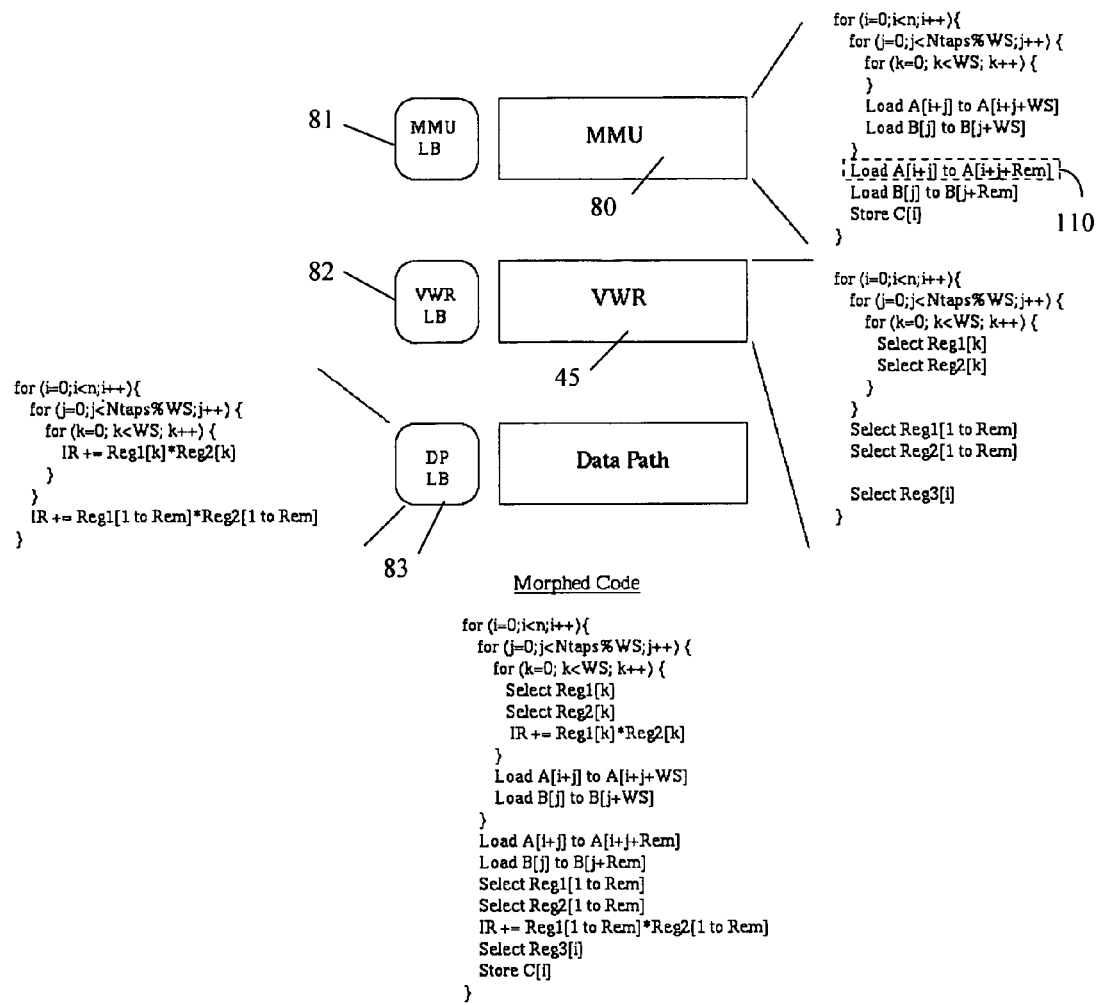
FIG. 11 illustrates different instruction loop buffers having different organisations and different code.

At compile time, during step 102, code is generated for the different parts of the architecture (for e.g. the very wide registers 45, for the memory management unit 80, for the datapath etc.). As an example, for an FIR filter the different code required by the various units is shown in FIG. 11.

This code, generated at compile time, is then loop morphed, during step 103, into a single code for all parts. This code is also annotated, step 104, with control flags (for example 4 bits long) to differentiate which loop buffer LB the code has to be placed in during run-time phase 101.

Based on these control flags, the architecture will then load the loop buffers accordingly during run-time phase 101, step 105. An example of hardware required to orchestrate this load operation is illustrated in FIG. 12. Based on the last 4 bits in the IL1 cache, during the filling loop buffer mode, the decoded instructions can be loaded onto the individual loop buffers MMU LB 81, MUX LB 82, DP LB 83. Each of the control bits specify which loop buffer the code has to be loaded to. It may be possible to optimize the number of bits required for such an assignment to the loop buffers based on e.g. mutual exception of code between two or more loop buffers or by other compiler directives.

Since the execution from each of these loop buffers is synchronized to the same system clock, it will not lead to asynchronous operation. This technique of loading the loop buffers is not dependent on the underlying architecture and can potentially be used also in other systems which have a distributed loop buffer organization. The architecture may comprise multiple datapaths, multiple memory management units MMUs or multiple very wide registers VWRs each needing their own, one ore more, loop buffer organization(s).

Figures 13, 14:
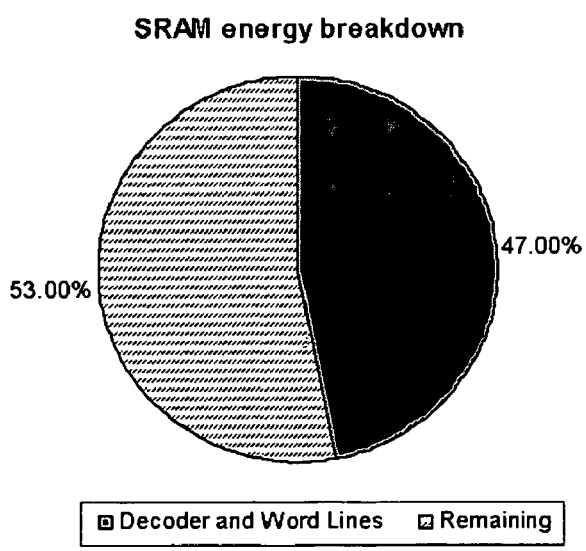
FIG. 13 illustrates different loop organizations inferred from morphed loop code.
FIG. 14 is a graph of SRAM power breakdown.

The loop organizations, i.e. the number of times a loop is executed, in the different loop buffers can be very different. Some combinations for the different possible loop organizations are shown in FIG. 13. It can be seen that one possible derived loop organization is a multiplication of two loop iterator spaces (Derived Organizations 2 and 4). Another possible derived loop organization is to drop out certain loop iterators (Derived Organization 3).

For an example of an FIR filter, FIG. 11 shows the different loop buffer contents, before loop morphing, in a high level language. Loop morphing may e.g. be carried out in accordance with the teaching of Gomez J. I., Marchal P., Verdoorlaege S., Pinuel L. and Catthoor, F in "Optimizing the memory bandwidth with loop morphing", IEEE International Conference on Application-Specific Systems, Architectures and Processors, September 2004, pp-213-223, or in any other suitable way.

Loop morphing is applied on code obtained for a same application. It can be seen from FIG. 11 that the loop organization for each of the loop buffers are slightly different although they run synchronously. A first loop buffer content is code corresponding to a loop buffer organisation for the memory management unit 80. A second loop buffer content is code corresponding to a loop buffer organisation for a selector associated with a very wide register 45. A third loop buffer content is code corresponding to a loop buffer organisation for the data path. It can be seen from FIG. 11 that the second and the third loop organisations are the same, but that the first loop buffer organisation is different. The codes for the three loop buffers, however, are different.

The MMU loop buffer 81 contains the different loads and store operations that fetch and store data from and to the first memory unit 42. The MUX loop buffer 82 of the very wide register 45 contains a counter that will increment at every loop iteration and this will also help select the operands from the registers which are to be operated on the datapath. For example, operands 1 to 10 have to be selected for every load of the FIR operation. This loop buffer will also select the output register, where the result of the operation has to be stored. The datapath loop buffers 83 select the datapath which has to be activated for the required arithmetic or logic operation.

Although for optimal efficiency in the domain of biomedical applications, it would be more efficient to have only one level of data hierarchy on chip, only scratchpad memory for caching, the proposed technique according to a further embodiment of the present invention is applicable to on-chip memories with multiple levels of hierarchy as well. The scratchpad would get the data from the first memory unit 42 directly using a memory management unit (MMU). The data in the scratchpad is managed by the MMU, which resides between the scratchpad and the foreground memory (register file and VWR). The task of the MMU is to compute the addresses required for the data and feed it to the scratchpad memory at the correct moment in time. The MMU has at least the functionality of a load store unit in a VLIW but with extensions. The distributed MMU can load or store complete lines from the scratchpad to the very wide registers 45 according to the first embodiment of the present invention or vice-versa. As an example only, for this architecture, the VWRs 45, the width of the buses 47, 49 and the scratchpad memory line size are all considered to be the same (for example all 128 bits). The scratchpad memory line size determines the width of the buses 47, 49 and the width of the buses 47, 49 determines the width of the very wide registers 45. With such architecture there will be large savings in energy consumed in the scratchpad memory because there will be much lower number of activations of the bit-lines and the decoders of the scratchpad compared to the state-of-the-art where lower number of words are read in every read operation from the memory. From the power split-up for an SRAM scratchpad shown in FIG. 14, it can be inferred that by reducing the number of activations of the word lines and the decoder, there will be a large saving in the energy consumed in the SRAMs as well.

The MMU 80 is capable of selectively enabling only certain number of sense-amplifiers of the scratchpad such that a plurality of words from the same line can be read to the very wide registers 45, e.g. the line of code indicated with 110 in FIG. 11 would enable a number Rem of words to be loaded. The MMU 80 is controlled using its own loop-buffer 81, this loop buffer 81 will contain its corresponding instructions. The instructions for the MMU operation for the FIR filter example can be seen in FIG. 11.

Figure 15:
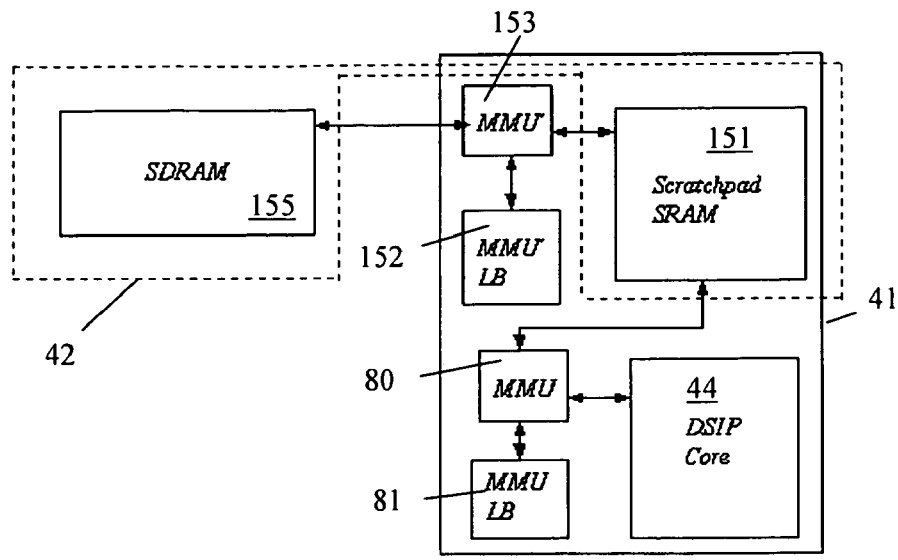
FIG. 15 diagrammatically illustrates external memory and its loop buffer organization.
Figure 16:
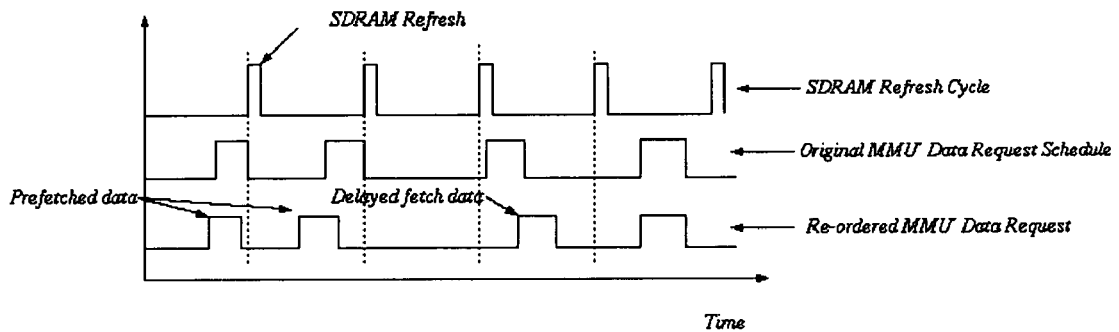
FIG. 16 illustrates external SDRAM request scheduling.

For accessing data from a memory part of the first memory unit 42, e.g. an external SDRAM 155, to the scratchpad 151 it is possible to provide another loop buffer 152 which instructs the data fetch from the memory part 155 to the scratchpad 151. The organization of the second memory management unit MMU' 153 which issues the requests of data from the memory part 155, e.g. SDRAM, to the scratchpad 151 is shown in FIG. 15. FIG. 15 also shows the distributed MMU, MMU' organization with their corresponding loop buffers MMU LB 81, MMU' LB 152 which contain their corresponding instructions. Since external SDRAMs 155 require refresh at a constant frequency, it has to be ensured that there is no overlap in the request from the core 44 and the refresh cycle. This is illustrated in FIG. 16. Since in the application domain relevant for the present invention, all data accesses are analyzable at compile time, it is possible to reschedule accesses to the external memory 42, e.g. SDRAM, in such a way that they do not overlap with the refresh cycles of the SDRAM.

Figure 17:
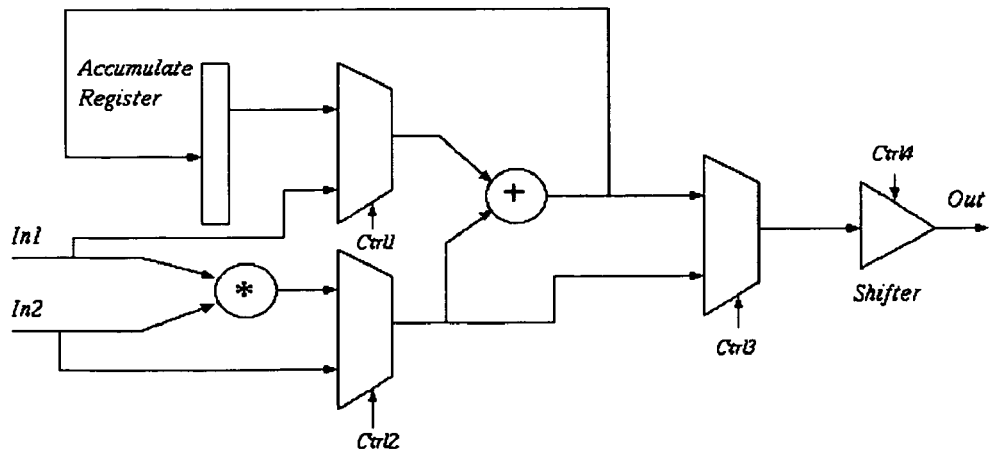
FIG. 17 shows an example of a datapath organization.

The foreground memory comprises very wide registers 45 and is connected to a datapath which consists of multipliers, adders, accumulators, shifters, comparators etc. One such organization is shown in FIG. 17. The inputs to the datapath In1 and In2 come from the very wide registers 45 and the output Out is be written back to one of the very wide registers 45. The selection of which datapath to operate on is decided by the Datapath loop buffer 83 as described above. Hence, the signals Ctrl1, Ctrl2, Ctrl3 and Ctrl4 to the multiplexers and to the shifter are provided by the loop buffer 83.

Figure 18:
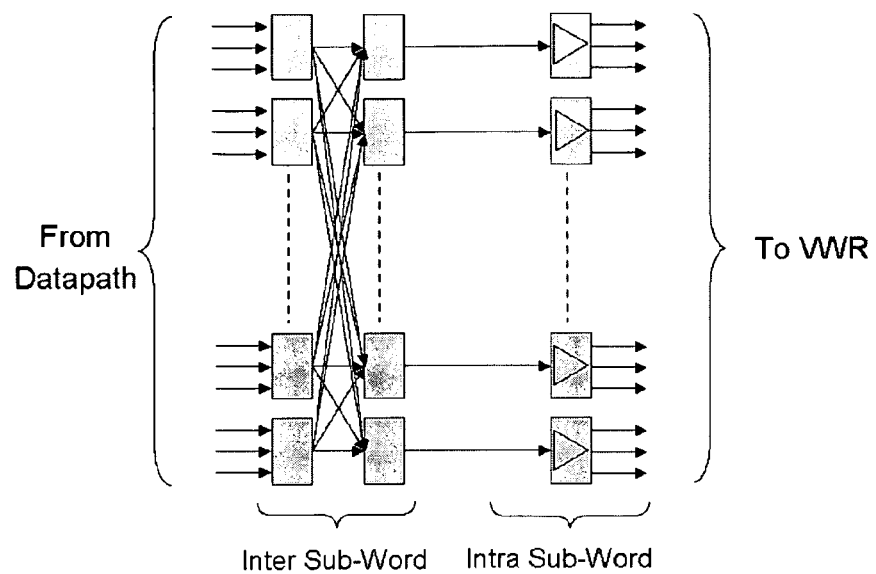
FIG. 18 illustrates a two stage shifter.

The datapath used with the present invention can support sub-word parallelism similar to processor engines like Altivec, MMX or SSE2. This means that, as data for e.g. multimedia operations is often much narrower than the data word of modern processors, rather than waste the ALUs when operating on lower word lengths, the instructions can operate on several narrower data items at the same time. For example, a "partitioned add" operation on 16-bit data with a 64-bit functional unit would perform four 16-bit adds in a single clock cycle. Such operations are commonly also called single-instruction multiple-data (SIMD) instructions. Hence each word read from a very wide register 45 according to the present invention would consist of one or more subwords. The selection of the exact subword organization is also done by the loop buffer 83 which drives the datapath. Since the datapath supports subword parallel operation, the data layout should be done correctly. For efficient usage of the datapath, the data layout in the scratchpad 151 and in the very wide registers 45 is essential. To achieve such a data layout the datapath has to support pack and unpack operations. Packing operations comprise shuffling sub-words or bits of a plurality of words so as to form a new word, as well as bit shuffling within a sub-word so as to form another word. Alternatively, a same result avoiding packing operations may be achieved by using a two-stage low power logarithmic shifter as e.g. shown in FIG. 18. The shifter consists of two stages: inter-subword shift, i.e. sub-words of different words are shifted so as to form a new word, and intra-subword shift, i.e. bits within a word are shifted so as to form a new word.

because this has to be done every cycle in the kernel. This is the motivation towards using distributed loop buffers for each of the different components (MMU, VWR and Datapath).

Another interesting inference from the figure is that the energy consumed in the register files RF reduces as well, since the registers are single ported and may contain data of a plurality of words. The energy spent in the data memory hierarchy DMH also reduces since the number of times the scratchpad or the cache is accessed is reduced and also all data retrieved from the scratchpad is utilized completely.

The datapath supports subword parallelism to increase the throughput of the system. Hence the datapath is always filled and utilized to the fullest to reduce the energy consumption further.

Figure 20:
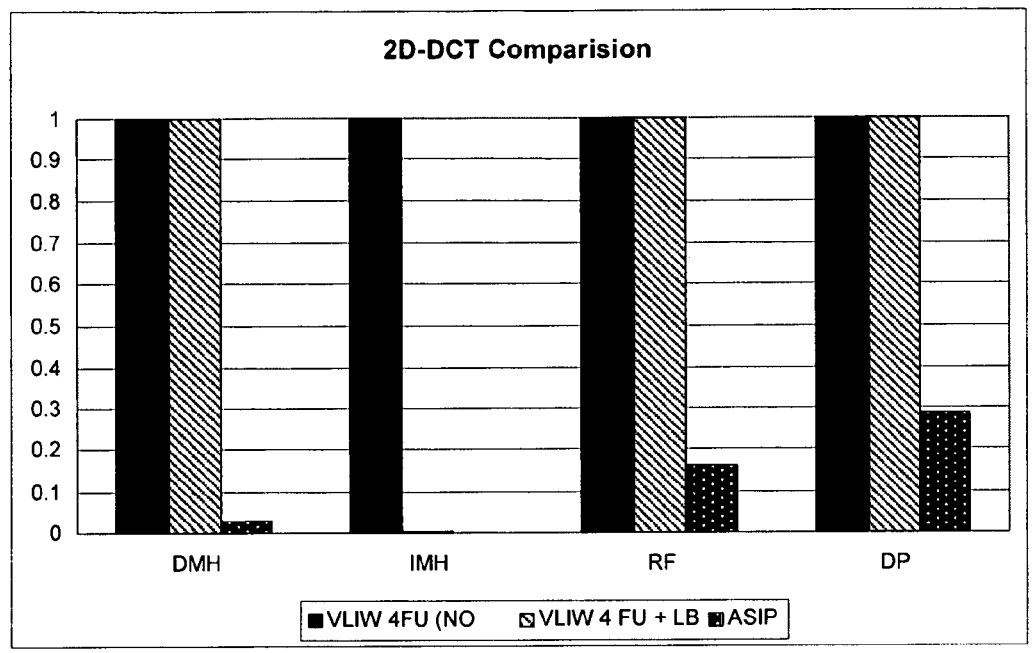
FIG. 20 shows 2D DCT comparison results for different architectures.

As a second example, similar results for 2D-DCT are shown in FIG. 20. Table 1 also shows the comparison in terms of MIPS/mW It can be clearly seen that the proposed ASIP architecture according to an embodiment of the present invention outperforms the VLIW with 4 functional units and the VLIW with 4 functional units and the loop buffer.

TABLE 1

| | Energy Efficiency Comparison in MIPS/mW | | | | | |
|---|---|---|---|---|---|---|
| | VLIW 4 Fus (without LB) | | VLIW 4 Fus (with LB) | | Proposed ASIP | |
| algorithm | Core DP + RF | System DP + RF + IMH + DMH | Core DP + RF | System DP + RF + IMH + DMH | Core DP + RF | System DP + RF + IMH + DMH |
| 200 Tap FIR | 50.75 | 2.81 | 50.75 | 7.18 | 788.539 | 266.14 |
| 2D-DCT | 68.94 | 0.600 | 68.94 | 2.309 | 414.77 | 114.32 |

To prove the working and possible gains of an architecture according to embodiments of the present invention, an FIR filter and a 2D-DCT algorithm were mapped on this architecture. Furthermore, the architecture according to an embodiment of the present invention is compared to two other architectures:

(1) a VLIW with 4 functional units but no loop buffers in its instruction memory hierarchy, and (2) a VLIW with 4 functional units and a loop buffer in its instruction memory hierarchy (prior art).

It is to be noted that the instructions are always counted as happening on a RISC with 1 functional unit, e.g. a VLIW with 8 ALUs offering each 1 million add/subtracts per sec, has 8 RISC MIPS in total. If a multiplier with 1 million multiplications per sec is present, this will be counted as 1 RISC MIPS. Therefore no distinction will be made between the type of unit, although for energy considerations that is of course not fully correct. Therefore the energy efficiency of a processor can be measured in terms of MIPS/mW.

Figure 19:
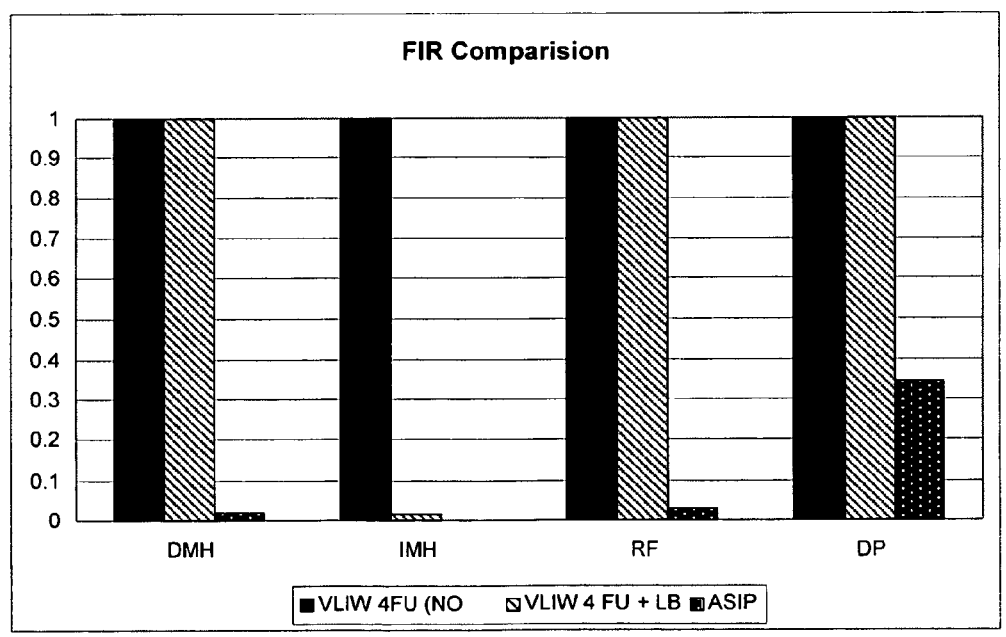
FIG. 19 shows FIR comparison results for different architectures.

As a first example, a 200 tap FIR filter is considered, where the data size is 16 bit. FIG. 19 shows the energy consumption comparison between a VLIW with no loop buffers in its instruction memory hierarchy (left hand graph), a VLIW with loop buffers (middle graph) and the ASIP architecture according to the present invention (right hand graph) for the FIR filter benchmark. It can be seen from FIG. 19 that for the VLIW with no loop buffers in its instruction memory hierarchy, most of the energy is spent in fetching instructions from the level 1 instruction cache to the core. This is especially From the above examples, it can be concluded that the architecture according to embodiments of the present invention is extremely energy efficient without loss in performance.

Figure 21:
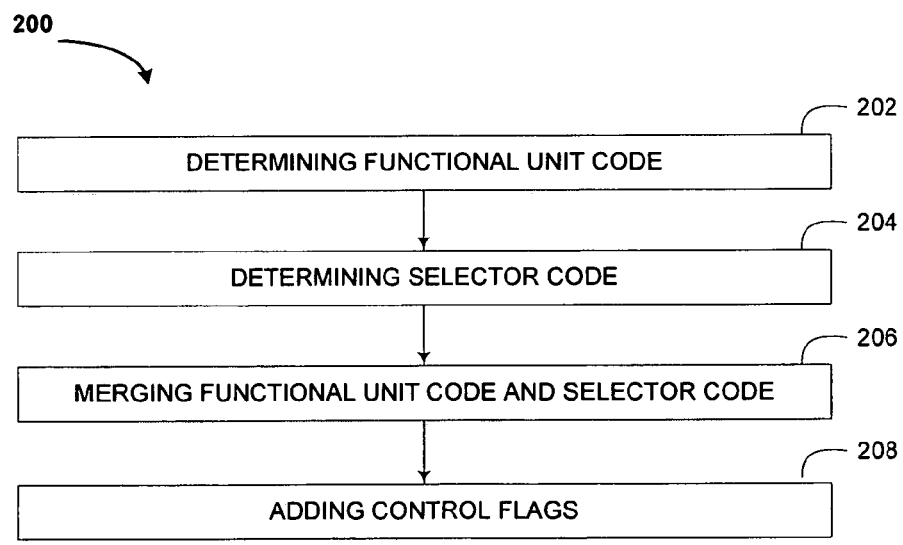
FIG. 21 illustrates a method to convert application code into execution code according to an embodiment.

FIG. 21 illustrates a method to convert application code into execution code according to an embodiment. The method takes application code as input and coverts the application code into executable code suitable for execution on certain embodiments of an microcomputer architecture shown above. The method 200 begins at a block 202, in which functional unit code is determined based on the application code. Next at a block 204, selector code is determined based on the application code. Moving to a block 206, the functional unit code and the selector code are merged to obtain a single code. Last at a block 208, control flags are added to the single code for indicating which instruction buffers the single code should be placed into.

It is to be understood that although preferred embodiments, specific constructions and configurations, as well as materials, have been discussed herein for devices according to the present invention, various changes or modifications in form and detail may be made without departing from the scope and spirit of this invention.

What is claimed is:

1. A microcomputer architecture comprising:
  a microprocessor unit comprising a functional unit having a width of one word and a data register, the functional unit and the data register being linked to a data bus internal to the microprocessor unit; and a first memory unit, wherein the data register is a wide register comprising a plurality of second memory units which are capable to each contain one word, the wide register being adapted so that the second memory units are simultaneously accessible by the first memory unit, and at least part of the second memory units are separately accessible by the functional unit, wherein the data register has a width determined by the number of second memory units in the data register, wherein the data register is a single-ported register.

2. The microcomputer architecture according to claim 1, wherein the microprocessor unit and the first memory unit being coupled to a system bus having a bus width, the plurality of second memory units in the wide register together having a register width, wherein the bus width equals the register width.

3. The microcomputer architecture according to claim 2, the first memory unit having a line width, wherein the bus width equals the line width of the first memory unit.

4. The microcomputer architecture according to claim 2, the first memory unit having a line width, wherein the bus width equals the line width.

5. The microcomputer architecture according to claim 1, wherein the microprocessor unit further comprises a selector for selecting words in the data register.

6. The microcomputer architecture according to claim 5, wherein the selector is a multiplexer configured to select words to be read from the data register.

7. The microcomputer architecture according to claim 6, wherein the functional unit is an application specific unit coupled to the multiplexer for processing selected data from the data register.

8. The microcomputer architecture according to claim 6, wherein the functional unit is a general purpose unit coupled to the multiplexer for processing selected data from the data register.

9. The microcomputer architecture according to claim 5, wherein the selector comprises a demultiplexer configured to select, in the data register, words to be written.

10. The microcomputer architecture according to claim 5, the microcomputer architecture further comprises at least a memory management unit for transferring data from and to the first memory unit to and from the data register, wherein each of the functional unit, the memory management unit and the selector has their own instruction buffer associated therewith.

11. The microcomputer architecture according to claim 10, wherein each of the instruction buffers is adapted for storing different code.

12. The microcomputer architecture according to claim 1, further comprising a further data register comprising a plurality of second memory units which are capable to each contain one word, the further data register being configured so that the second memory units are simultaneously accessible by the first memory unit, and at least one of the second memory units of the further data register is separately accessible by the functional unit.

13. The microcomputer architecture according to claim 12, further comprising a demultiplexer connected between the functional unit and the further data register.

14. The microcomputer architecture according to claim 1, wherein each word comprises a plurality of subwords, the architecture further comprising a data shifter for shifting subwords or parts of subwords so as to form a new word.

15. The microcomputer architecture according to claim 1, wherein the microprocessor unit comprises no more than one selector for selecting words in the data register.

16. The microcomputer architecture according to claim 1, further comprising a further functional unit, the at least part of the second memory units of the data register being separately accessible by the further functional unit.

17. The microcomputer architecture according to claim 12, further comprising a further functional unit, the at least one of the second memory units of the further data register being separately accessible by the further functional unit.

* * * * *